(12) United States Patent
Fernandez

(10) Patent No.: US 11,488,202 B2
(45) Date of Patent: Nov. 1, 2022

(54) UNIFIED CHANNEL MANAGEMENT

(71) Applicant: NCR Corporation, Duluth, GA (US)

(72) Inventor: Antonio M. Fernandez, Jupiter, FL (US)

(73) Assignee: NCR Corporation, Atlanta, GA (US)

( * ) Notice: Subject to any disclaimer, the term of this patent is extended or adjusted under 35 U.S.C. 154(b) by 337 days.

(21) Appl. No.: 14/193,392

(22) Filed: Feb. 28, 2014

(65) Prior Publication Data

US 2015/0248696 A1    Sep. 3, 2015

(51) Int. Cl.
*G06Q 40/00*     (2012.01)
*G06Q 30/02*     (2012.01)
*G06Q 10/08*     (2012.01)

(52) U.S. Cl.
CPC ....... *G06Q 30/0253* (2013.01); *G06Q 10/087* (2013.01); *G06Q 30/0268* (2013.01)

(58) Field of Classification Search
CPC .......... G06Q 30/0253; G06Q 30/0268; G06Q 10/087
See application file for complete search history.

(56) References Cited

U.S. PATENT DOCUMENTS

| | | | | |
|---|---|---|---|---|
| 2007/0100981 A1* | 5/2007 | Adamczyk | ............... | H04L 69/18 |
| | | | | 709/223 |
| 2009/0011780 A1* | 1/2009 | Salinas | ................... | H04L 51/28 |
| | | | | 455/466 |
| 2009/0228379 A1* | 9/2009 | Honts | .................... | G06Q 40/00 |
| | | | | 705/30 |
| 2009/0254971 A1* | 10/2009 | Herz | ....................... | G06Q 10/10 |
| | | | | 726/1 |
| 2011/0225417 A1* | 9/2011 | Maharajh | ................ | G06F 21/10 |
| | | | | 713/150 |
| 2011/0264581 A1* | 10/2011 | Clyne | .................... | G06Q 20/10 |
| | | | | 705/39 |
| 2015/0127720 A1* | 5/2015 | Glommen | ............... | H04L 67/10 |
| | | | | 709/203 |

OTHER PUBLICATIONS

Authorization of Data Access in Distributed Storage Systems, D. Feichtinger, p. 1, IEEE, Jan. 1, 2005 (Year: 2005).*

* cited by examiner

*Primary Examiner* — John Van Bramer
*Assistant Examiner* — Darnella Pouncil
(74) *Attorney, Agent, or Firm* — Schwegman, Lundberg & Woessner

(57) ABSTRACT

A transaction for a customer is detected and transaction details are evaluated to obtain a federated customer profile that may span multiple channel communications. Policy conditions are evaluated to track and interact with the customer in a vendor-defined manner during the transaction. According to an embodiment, the transaction details, the customer profile, the tracked information, and other recorded interactions with the customer are accessible to the vendor for analysis, via a vendor interface.

7 Claims, 4 Drawing Sheets

UNIFIED CHANNEL MANAGEMENT

BACKGROUND

Technology and automation has been aggressively adopted and integrated into the business practices of many industries. Nowhere is this more apparent than the travel and hospitality industries.

Customers can purchase airline tickets online and check-in for their flights by using their mobile devices. They have the ability to check-in to their hotel rooms and make restaurant reservations through kiosks. Automated messages can be pushed to inform customers what stall their rental cards when their flight lands. Technology is positively impacting a passenger's journey and making their everyday processes easier.

Retailers quickly learned that the ability to reach their customers at the right time and right location can be lucrative in marketing ancillary or partner products and services. In fact, much of the travel and hospitality industry's growth in recent years is highly attributable to these industries marketing those ancillary products and services via multiple technology channels consistently reach the consumer at the right time and place. This growing trend is leading travel suppliers to adopt best practices from the hospitality industry and driving them to act more like retailers.

One major interest of the travel and hospitality industries and the retail industry, generally, is the ability to track and reach their customers consistently across all available communication channels, some which are currently not accessible to those industries. For example, the airline industry still seeks to improve the technology and ability to reach and track consumers throughout their journey including pre and post trip venues off airport.

Moreover, managing integrated inventory systems, payment systems, loyalty systems, marketing systems, and analytic systems is a difficult and an expensive endeavor for even the largest company to handle. This is further complicated with a travel supplier's geographic and off-line connectivity requirements. Leading to smaller start-up companies from even attempting to compete with the larger companies.

SUMMARY

In various embodiments, methods and system for unified channel management are presented.

According to an embodiment, a method for unified channel management is provided. Specifically, in an embodiment, a transaction is identified over a channel and a profile for a consumer associated with a transaction is federated over at least one other channel. Finally, an advertisement is delivered during the transaction based on the federated profile.

DETAILED DESCRIPTION

Figure 1:
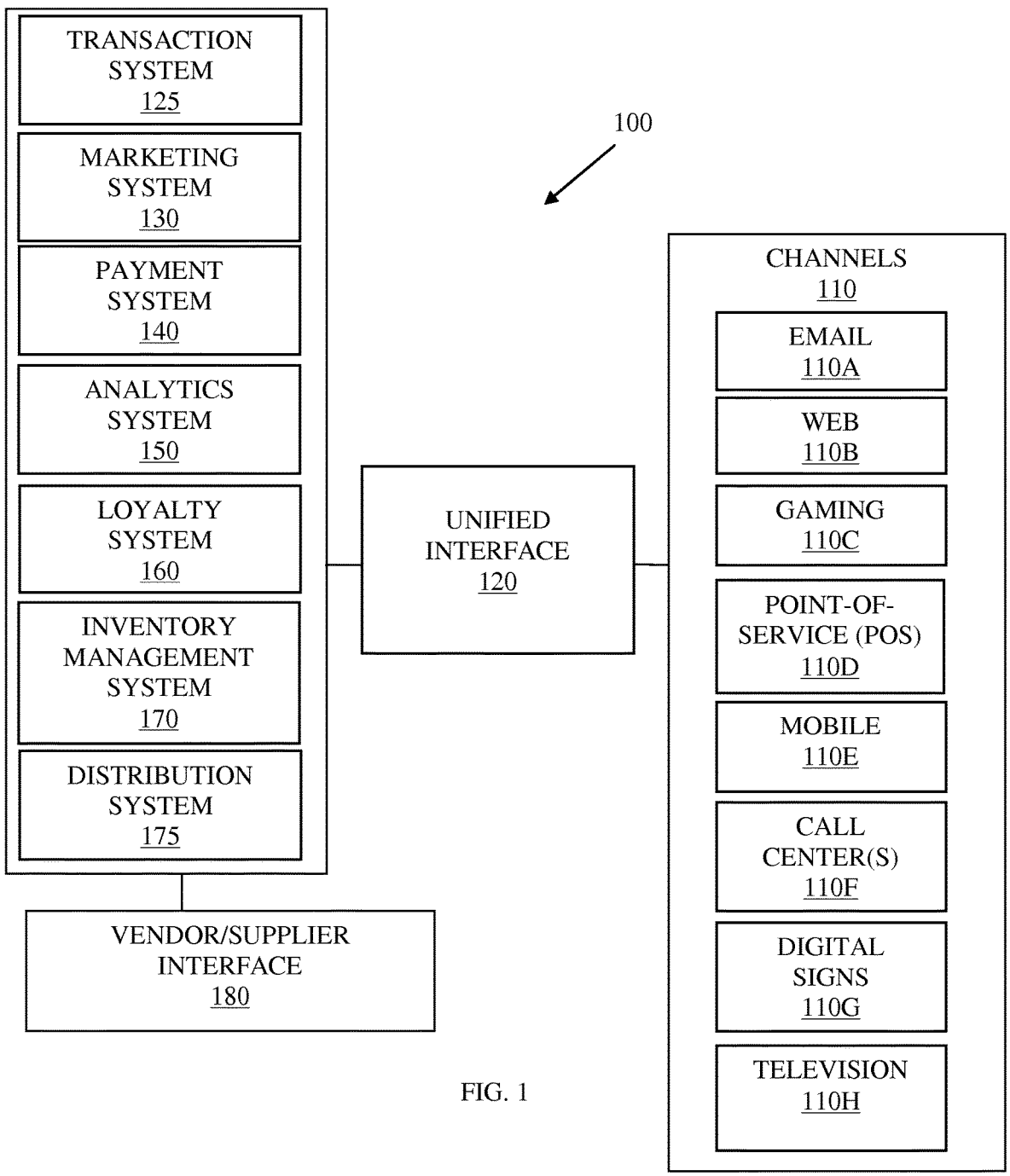
FIG. 1 is a diagram of an example architecture for practicing unified channel management, according to an example embodiment.

FIG. 1 is a diagram of an example architecture 100 for practicing unified channel management, according to an example embodiment. The architecture 100 is shown schematically in greatly simplified form, with only those components relevant to understanding of this embodiment being illustrated. The various components are illustrated and the arrangement of the components is presented for purposes of illustration only. It is to be noted that other arrangements with more or less components are possible without departing from the unified channel management presented herein and below.

The techniques, methods, and system presented herein and below for unified channel management can be implemented in whole or in part in one, all, or some combination of the components shown with the architecture 100. The techniques and methods are programmed as executable instructions in memory and/or non-transitory computer-readable storage media and processed on one or more processors associated with the components (may also be referred to as "modules").

In the embodiment for the architecture 100, the methods and system are implemented as one or more hardware and software components of travel and hospitality systems or integrated with external travel and hospitality systems.

Specifically, the architecture 100 permits a consumer transaction at a device on one communication channel 110 to experience the same directed marketing that the consumer experiences on other communication channels 110 while interacting with the device. This is achieved by unifying disparate transaction processing, distribution mechanisms, and backend systems for the devices associated with the channels 110A-110H through a unified interface 120 (this can be achieved via a proxy redirection for the channels 110 to the unified interface 120 while the consumer transacts on the devices). The unified interface 120 has access to a variety of backend systems 125-175 of interest to partnering vendors or suppliers. Moreover, profiles for the consumer can be federated and provided in a normalized format to the vendors or suppliers through the vendor/supplier interface 180. So, the customer (the terms "customer" and "consumer" are used interchangeably herein) experiences a unified view of vendor or supplier offerings (regardless of the channel communications used by the customer to transact), and the vendor or supplier can manage, analyze, and reach its customers through a common vendor/supplier interface 180 (which may also be available across multiple channels and devices, such as via a browser-based interface).

As used herein, a "profile" includes a variety of information tied to a consumer. Some of this information includes, by way of example only, transaction history (electronic, phone, and/or in-person), contact history (electronic, phone, and/or in-person interactions noted by an enterprise when occurring with the consumer), complaints noted by the consumer (electronic, phone, and/or in-person), electronic search history, websites or services accessed by the consumer (electronic, phone, and/or in-person), preferences recorded by the consumer for various websites or services (electronic, phone, and/or in-person), and the like and regardless of the backend systems 125-175 the data was collected and stored on.

According to an embodiment, customer profiles can be maintained as being: specific customer profiles for a subscribing vendor or supplier, specific to selective groups of subscribing vendors or suppliers, or federated as a single profile across all subscribing vendors or supplies for each customer. Still further, and if desired, a profile can be provided for a single channel 110 or sets of channels 110 for any given customer.

The architecture 100 is now discussed in greater detail along with its components in view of the discussion above. It is to be noted that the methods and system presented herein are not just limited to travel and hospitality solutions; that is, any industry can benefit from the unified channel management mechanisms discussed herein The architecture 100 includes communication channels 110, a unified interface 120, transaction system 125, a marketing system 130, a payment system 140, an analytics system 150, a loyalty system 160, an inventory management system 170, a distribution system 175, and a vendor/supplier interface 180. The channels 110 include channels tied to communications associated with: email 110A, Web-based activity (services over the Internet) 110B, a gaming device 110C, a Point-of-Service (POS) device 110D (Self-Service, Cashier manned, kiosk, etc.), a mobile device 110E, call centers 110F, digital signs 110G, and Television 110H.

The channels 110 represent transactions and/or actions that any given consumer may engage in using a variety of devices. For example, the consumer may engage in email communications associated with a known (registered or used) email 110A for the consumer. The consumer may also have browser-based access to a variety of network services, which are associated with web applications 110B. The web applications 110B may, in some instances, include cookies, stored local to a processing device of the consumer, or stored remotely in a profile associated with the web applications 110B. The consumer can be engaged in game play or wagering, via gaming devices 110C. Moreover, when the consumer interacts with a POS device 110D (Self-Service Terminal (SST), cashier-assisted terminal, kiosk, any transaction device capable of receiving marketing information and transacting in a purchase for a good or a service (note this can represent some of the devices already described in channels 110), etc.), the consumer may enter data (such as a loyalty card or credit card) that permits capturing and recording profile data associated with the consumer. The consumer may also use mobile devices 110E (phones, laptops, tablets, wearable processing devices, etc.) to access some web applications 110B or to access mobile applications associated with services (Delta®, Hertz®, Hilton®, and others). The consumer can also, from time-to-time, call a call center 110F of a particular enterprise for purchases, support, complaints, etc. These interactions with call centers 110F are stored in profiles. In some case, the consumer may interact with digital signage 110G to conduct a transaction through any other channel 110. Still further, the consumers may conduct transactions while viewing television 110H based on relevant advertising offered.

The unified interface 120 is referenced during a consumer transaction by subscribing vendors of the services of the unified interface 120 authorizing a redirection from their existing interfaces associated with the channels 110 to the unified interface 120. This can also be done transparently, such as via a proxy configuration where communications from the channels 110 and to the channels 100 are directed to the unified interface 120.

The unified interface 120 can receive a variety of information (transaction details) for any given customer transaction occurring from the channels. The transaction details can include, by way of example only, customer identifying information (loyalty number, registered email, registered phone number, address, name, etc.), session identifier for the transaction initiated by the consumer over one of the channels 110, device identifier for the device being used or being used on behalf of the consumer, device location, enterprise identifier associated with the device, enterprise identifier associated with the transaction, state of the transaction (start, product selection, payment, receipt, etc.), security level associated with the transaction and/or consumer, and/or perhaps, other configured data.

The transaction details permit the unified interface 120 to perform a variety of actions. (It is noted that multiple sub-transactions can be required during a single transaction for a consumer by the unified interface 120.) There may also be multiple interactions back and forth between an Application Programming Interface (API) that permits communications to be delivered and processed between an interface operating on a channel device used by or used on behalf of the consumer and the unified interface 120.

For example, at a start of a transaction, the transaction details are redirected to the unified interface 120. The customer identifying information is extracted to access the loyalty system 160 and acquire a then-existing profile for the consumer. Policy conditions can be serviced from the consumer's loyalty profile and/or policies tied to an identity of the channel device being used, an identity of an enterprise tied to the interface being used for the transaction (e.g., travel, food, etc.), policies tied to the physical location of the channel device, policy conditions tied to a time of day, day of the week, and/or the calendar day, policy conditions tied to licensing agreements with the vendors/suppliers, and others. The policy conditions are dynamically evaluated to select an appropriate system 125-175 and actions to perform against those selected systems 125-175, such as, by way of example only, delivering a targeted and relevant (context and/or location relevant) advertisement (available from the marketing system 130) from a selected vendor with a vendor-permitted offer during the transaction being performed by the consumer at the channel device, the format of the presented advertisement customizable by the selected vendor, via the vendor/supplier interface 180.

Assuming, the consumer clicks or accepts the advertisement from the channel device, the unified interface 120 can reserve the associated product or service and/or cause delivery of the product or service via interactions with the inventory management system 170 and the distribution system 175. Payment processing for the good or service is initiated via the transaction system 125 and/or the payment system 140 (can be externally serviced through one or more transaction/payment gateways). In an embodiment, the transaction system 125 and the payment system 140 are subsumed into one logical system. Moreover, during the whole of the transaction, metrics are gathered and housed by the unified interface 120 via the analytics system (the other systems assisting in facilitating transaction processing for the transaction can also record metrics in the analytics system 150—such as the transaction system 125, the payment system 140, etc.). It is noted that underlying the metrics and data relied on by each of the systems 125-175 (to varying degrees) can reside in one or more data warehouses (not shown in the FIG. 1).

The transaction system 125 can include a variety of internally and externally managed transaction engines that are integrated and appear to be a single transaction system 125. The transaction system 125 receives selective transaction details from the unified interface 120 for any given consumer transaction. The components of the transaction system 125 permit such things as identification of payment methods (loyalty card, credit card, debit card, coupon discount, gift card, bank account, etc.), computation of total price for the transaction (tax and/or any discounts applied), selection of a payment system 140, identification of a servicing vendor for any goods or services tied to the transaction, and the like.

The marketing system 130 can include a variety of managed sub systems that are managed and integrated as one logical marketing system 130. Each sub system capable of being defined via automated (API calls from processing applications) or manual (vendor/supplier interface 180) interfaces. Each sub system, via the automated or manual interface, capable of initiating marketing activity and tracking results. Still further, some of the actions associated with the sub systems can rely on information and services available in the analytics system 150, the loyalty system 160, and the inventory management system 170. In some cases, a specific marketing campaign can be a vendor defined survey that can be served to the consumer on the channel device or via a different channel (defined by the vendor using the automated or manual interfaces).

In an embodiment, the marketing system 130 includes at least one sub system that directs target advertisements to a consumer during a transaction based on context of: what the consumer is doing (consumer activity on the channel device (searches by the consumer, questions being asked by the consumer of an associate operating the channel device, etc.), an itinerary known for a consumer (when the consumer is known to be traveling), and/or a resolved geographical location for a location of the channel device being operated by the consumer. So, the context can be situational based and/or location based. This permits relevant marketing to the consumer within a context (situational and/or location) that is most likely to benefit the consumer and generate a sale by a partnering vendor of the unified interface 120. For example consider a consumer having a mobile phone (mobile device 110E) that is known to be traveling (such as based on an airline check-in) to a known location (destination of the air travel available from the airline reservation and flight number of check-in). When that consumer arrives at a departure gate for his/her flight, the marketing system 125 can receive an event (raised by location based devices or specific transactions occurring (i.e., the airport staff scanning the consumer's boarding pass)), which indicates to the marketing system 125 that the consumer post security or at the gate ready to board the aircraft. The marketing system 125, via the unified interface 120, can then push advertisements for purchasing vendor services and products that are relevant to the consumer's flight, destination, or supporting services, such as alcohol or food purchase, Internet access, movie or entertainment download, car or rail transportation, accommodations, or city tour, etc. The consumer then selects a particular good or service and the unified interface 120 processes it through the various systems 125-175 (transparent to the consumer on the mobile device 110E). As a result of the purchase, the unified interface 120 delivers an electronic receipt of the transaction via a Quick Response (QR) code or bar code to the interface of the mobile device 110E. That electronic receipt can be scanned by the airline staff to confirm payment of the good or service. It may also be that a link is delivered, which permits a download of an entertainment selection to the mobile device 110E (or a code used for Internet access). In some cases, the consumer may need to take no action because the unified interface 120 transmits the confirmation of what was purchased to devices that are controlled by the airline staff or supplier along with a profile data for the consumer, such that the airline staff or supplier can deliver the appropriate good or service to the consumer. This is but one of many possible scenarios where the marketing system 125 is capable of delivering situational and/or location relevant marketing to the consumer when it would benefit that consumer and a vendor associated with a good or service.

The payment system 140 includes a variety of externally accessible payment gateways, supporting online and offline processing. Each payment gateway driven by the policy conditions discussed above for any given transaction. In some cases, the payment system 140 is activated by the transaction system 125 for purposes of confirming payment of a transaction from a consumer. In fact, the transaction system 125 in handling a transaction can select or identify for the payment system 140 the payment gateway that is to be used to complete the payment processing.

The analytics system 150 has access to the data warehouses for retrieval of data to perform mining and reporting. The mining activity may be related to marketing campaigns initiated by the marketing system 125. Moreover, the analytics system 150 may access one or more sub, and perhaps, external analytics systems 150 via API calls provided and defined by vendors or suppliers via automated (application processing using API calls to interface) or manual (vendor/supplier interface 180). This provides a holistic view of the consumer's transactions, spending habits, and value.

The loyalty system 160 can include a variety of sub loyalty systems defined by the vendors or suppliers via the automated (API calls from processing applications) or manual (vendor/supplier interface 180) interfaces. Moreover, in an embodiment, the loyalty system 160 includes a hierarchy of sub systems that includes a root hierarchy that ties or links a customer to all loyalty sub systems. Each level of the hierarchy below the root can represent one or more groupings of the sub systems. In this way, a profile of a customer for classes, groups, or industries can be defined. The level of access to the hierarchy that a subscribing vendor or supplier has can be dictated by policy conditions as well, such as subscription level of the vendor or supplier, and the like. Each customer loyalty record (can be many at various levels of the hierarchy as well as varying degrees of federated records at higher levels of the hierarchy) is associated with a customer profile (the details of which were previously discussed above). Moreover, some fields of each record can link to the analytics system 150 for dynamic calculation or resolution when a particular profile of a customer is served for a transaction (such as last activity noted and channel activity occurred on or a total number of activities for a particular product or service during a given time period).

The inventory management system 170 can include a variety of sub inventory management systems defined by each of the vendors or suppliers using the vendor/supplier interface 180. Some of these sub systems may also be external and accessed via API calls defined by the vendors or suppliers.

The distribution system 175 can include a variety of sub distribution systems defined by each of the vendors or suppliers using the vendor/supplier interface 180. The distribution system 175 permits scheduling and/or planning of needed resources for delivering goods or services to consumers performing transactions via the channels 110.

The vendor/supplier interface 180 presents an interface for vendors and suppliers that subscribe to the architecture for accessing the systems 125-175. In some cases, the interface is used to provide access and define API calls that the unified interface 120 is to use to access vendor/supplier-specific systems 125-175. This provides integration with what vendors and suppliers are already using. The interface

180 also permits vendor/supplier-specific policy conditions, marketing actions, payment options, and notifications.

The architecture 100 permits vendors/suppliers to maintain a consistent experience for the customers that they service across multiple disparate channels 110, and the architecture 100 permits delivery of situational and/or location relevant targeted advertisements to the consumers over those channels 110. Transactions can also be monitored and processed on behalf of the vendors or suppliers. Still further, any subscribing vendor or supplier to the architecture can reach customers in channels 110 that they previously may not have been able to reach and have access in those channels 110 to customer profiles for taking marketing actions (including situational and location-based context marketing actions).

It is noted that a variety of operating scenarios are possible and the above-noted unified channel management examples were presented to illustrate the power of one technique of the invention and was not intended to limit other operating scenarios achievable with the techniques presented herein.

Some of the above-noted aspects of the invention and other aspects are now presented and discussed with reference to the FIGS. 2-4.

Figure 2:
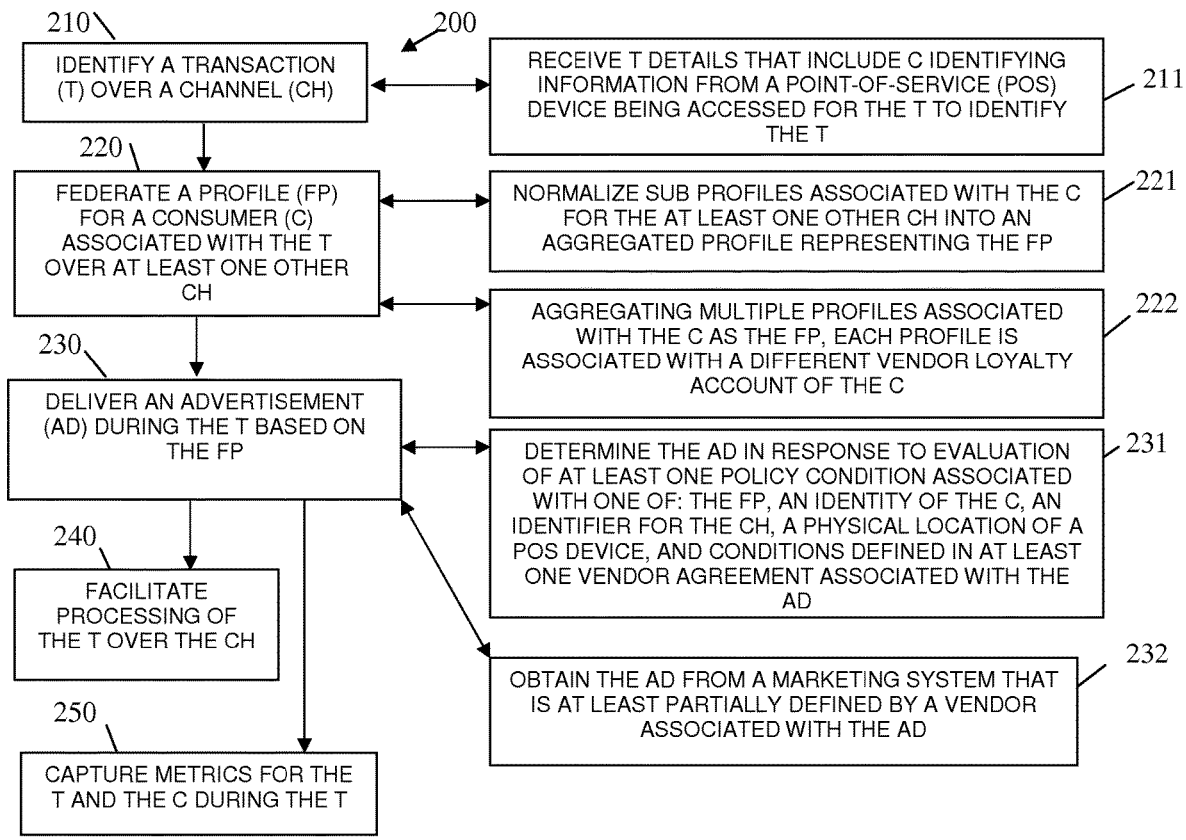
FIG. 2 is a diagram of a method for unified channel management, according to an example embodiment.

FIG. 2 is a diagram of a method 200 for unified channel management, according to an example embodiment. The software module(s) that implements the method 200 is referred to as a "channel transaction manager." The channel transaction manager is implemented as executable instructions programmed and residing within memory and/or a non-transitory computer-readable (processor-readable) storage medium and executed by one or more processors of a device. The processors of the device that executes the channel transaction manager are specifically configured and programmed to process the channel transaction manager. The channel transaction manager has access to one or more networks during its processing. The networks can be wired, wireless, or a combination of wired and wireless.

In an embodiment, the channel transaction manager is the unified interface 120 of the FIG. 1.

According to an embodiment, the device that executes the software module(s) representing the channel transaction manager is a proxy server. In an embodiment, the proxy server is a transparent proxy. In an embodiment, the proxy server is a forward proxy.

At 210, the channel transaction manager identifies a transaction occurring over a communication channel (any of the communication channels 110 from the FIG. 1).

According to an embodiment, at 211, the channel transaction manager receives transaction details from a POS device (POS 110D of the FIG. 1) that a consumer is accessing during the transaction. The transaction details can include a variety of information, such as consumer identifying information (loyalty account number, payment card number, vendor tied to the loyalty account number, registered email address, registered phone number, name, address, and the like). It is noted that the transaction details can include a variety of other useful information, such as one or more of: POS device identifier, time of day, day of week, calendar day, vendor identification supply goods or services relevant to the transaction, pricing information for the goods or services, available discounts, transaction communication session identifier, versioning information for the POS interface being accessed by the consumer for the transaction, and other information. The consumer identifying information permits the channel transaction manager to locate profiling data (can also be referred to as a "profile" herein) for the consumer. As stated above with reference to the discussion of the FIG. 1, the consumer can have multiple hierarchical profiles that span vendors and/or channels and each profile can include data discussed in the FIG. 1.

In an embodiment of 211, the trigger from the POS device (POS 110D) can occur from a beacon device or other form of transmitter that can initiate the interaction with a consumer. This can occur through or in cooperation with any channel 110.

It is also to be noted that a consumer can remain anonymous during transaction processing. This can be done when there is no available consumer identifying information or where the consumer by prior instructions wishes to remain anonymous. Moreover, a profile for an anonymous consumer can still be developed and derived based on evaluation of policy conditions associated with, perhaps, the time of day, day of week, calendar day, transaction type, goods or service purchased, POS device, channel used, and the like.

At 220, the channel transaction manager federates or aggregates a profile for a consumer associated with the transaction. Again, that consumer may be an "anonymous consumer" in some embodiments. For example, the loyalty system 160 of the FIG. 1 is queried using consumer identifying information (or an anonymous consumer identifier) to return one or more profiles to be associated with the consumer (the loyalty system 160 can include a variety of sub loyalty systems (some of which may be vendor-specific) as discussed in the FIG. 1).

According to an embodiment, at 221, the channel transaction manager normalizes sub profiles associated with the consumer for the at least one other channel into an aggregated profile representing the federated profile. This can include multiple channels, each of which can be disparate from the others. By normalizing, it is meant the channel transaction manager transforms the sub profiles into a proper processing and evaluation format that the channel transaction manager can generically handle, since some of the sub profiles may have been derived from disparate sub loyalty systems.

In an embodiment, at 222, the channel transaction manager aggregates multiple profiles associated with the consumer as the federated profile. Each profile is associated with a different vendor loyalty account of the consumer. The processing associated with such an aggregation was discussed herein and above.

At 230, the channel transaction manager delivers an advertisement during the transaction based on evaluation of the federated profile. In an embodiment, the advertisement is delivered from a marketing system 130 based on a relevant situational context of the consumer transaction and/or a location resolved for the consumer during the transaction (advertisement context and location-based). It is noted that the selection and delivery of the advertisement can also be based on other conditions defined outside the federated profile. These conditions are configurable parameters and dynamic in nature and can come for a variety of sources, such as an enterprise distributing the channel transaction manager as a service, a vendor associated with the POS device being used for the transaction, vendors associated with available advertisements, channel service providers, resolved location for the consumer, an itinerary known for the consumer, and/or other sources. The mechanism for selection can be configured based on conditions defined for the sources and at least a portion of the federated profile.

For example, and an embodiment at 231, the channel transaction manager determines the advertisement in response to evaluation of at least one policy condition associated with one or more of: the federated profile, an identity of the consumer (can be an anonymous identity in some situations), an identifier for the channel being used for the transaction, a physical location of a POS device being used for the transaction (location-based context), and an itinerary for the consumer during travel, and conditions defined in one or more vendor agreements associated with the advertisement.

According to an embodiment, at 232, the channel transaction manager obtains the advertisement from marketing system that is at least partially defined by a vendor associated with the advertisement. For example, a sub marketing system of the marketing system 130 defined by the vendor using the vendor/supplier interface 180 of the FIG. 1. The sub marketing system can be provided in an automated fashion as well via the interface 180, such as by defining or supplying schema definitions and API calls used in accessing and managing the sub marketing system. It is also noted that the marketing system 180 may provide generic marketing schemas, operations, and APIs accessible for the vendor to establish and maintain via the interface 180.

In an embodiment, at 240, the channel transaction manager facilitates the processing of the transaction over the channel being used for the transaction. This can entail accessing a variety of systems, such as the transaction system 125 and/or the payment system 140 (perhaps through gateways to employ external payment mechanisms), the marketing system 130 (perhaps to apply a discount or an offer related to the transaction), the analytics system 150 (perhaps to record metrics, initiate automatic notifications based on the metrics, initiate reports based on the metrics, etc.), the loyalty system 160 (perhaps to credit or debit one or more loyalty accounts of the consumer), the inventory management system 170 (perhaps to debit inventory, initiate an inventory replenishment order based on the purchase of the good or service, and the like), and the distribution system 175 (perhaps to initiate delivery of a good or service for the transaction, order and/or schedule the good or service, and the like).

In an embodiment, at 250, the channel transaction manager captures metrics for the transaction and the consumer during the transaction. The metrics can be housed via the analytics system 150 and/or directly or indirectly through a data warehouse, which may then trigger automated actions in the analytics system 150. It is also noted that the metrics can be captured for any entity or resource associated with the transaction; for example, the supplier of a good or service relevant to the transaction, a supplier of the POS device involved in the transaction. The analytics system 150 is capable of rolling up metrics for classes of transactions, industries, customers, or any vendor-defined roll-up acquired through the interface 180.

One now appreciates how a vendor can achieve multi-channel consistency (similar format, similar interface, similar advertisement and transactional items, etc.) with its customers to market (situational and location-based context) and manage its customer relationships through the processing capabilities of the channel transaction manager. This provides consistency and provides vendors with access to channel communications that they may never have had access to in the past because of vendor expense and/or vendor technology deficiencies and provides an opportunity to provide the consumer with marketing that is of benefit to the consumer at a relevant time and place when that marketing is received by the consumer, which makes a sale by a vendor more likely to occur and which satisfies a consumer and makes that consumer a return and loyal consumer to the vendor.

Figure 3:
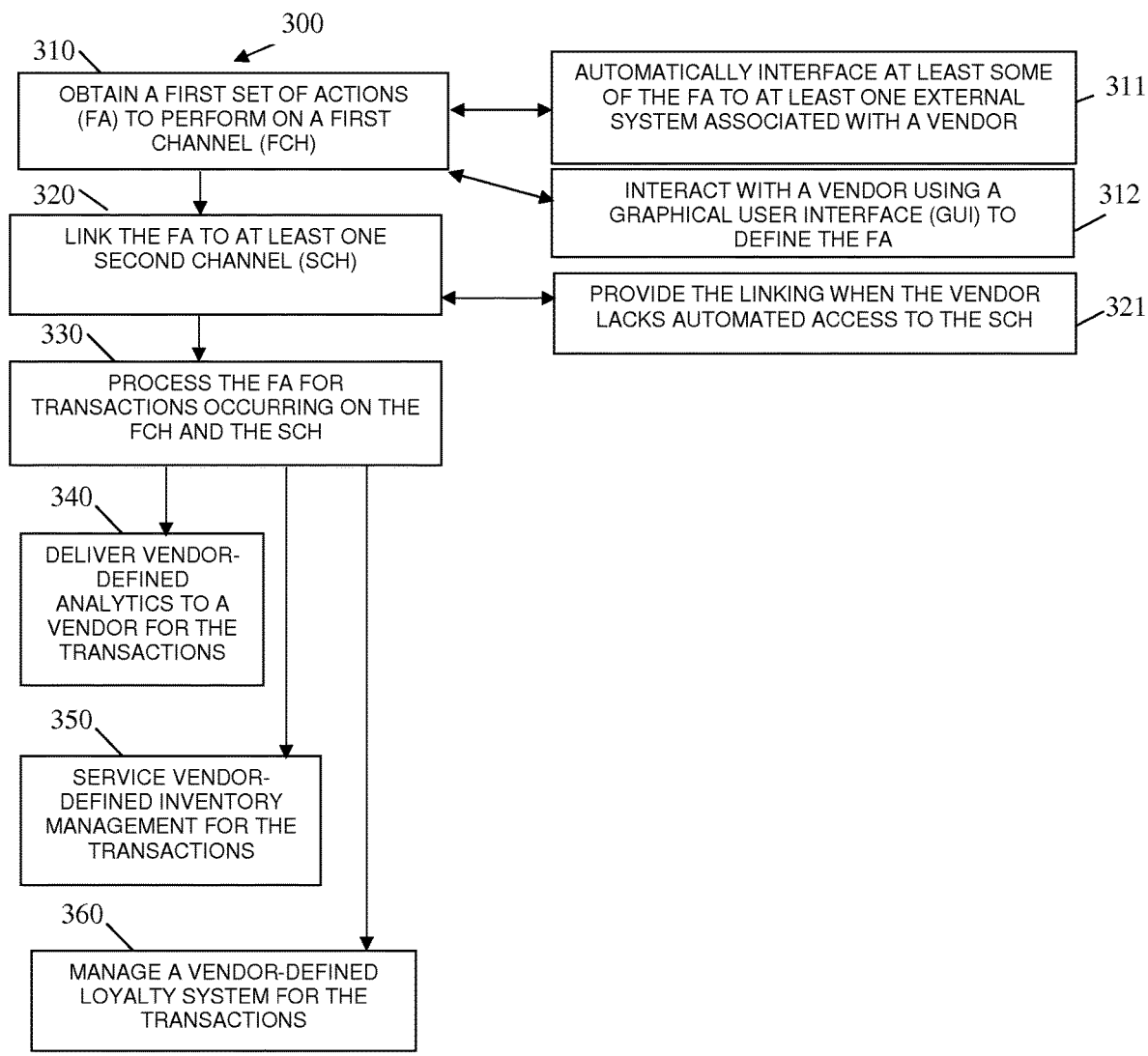
FIG. 3 is a diagram of another method for unified channel management, according to an example embodiment.

FIG. 3 is a diagram of another method 300 for unified channel management, according to an example embodiment. The software module(s) that implements the method 300 is referred to as a "vendor interface manager." The vendor interface manager is implemented as executable instructions programmed and residing within memory and/or a non-transitory computer-readable (processor-readable) storage medium and executed by one or more processors of a device. The processors of the device that executes the vendor interface manager are specifically configured and programmed to process the vendor interface manager. The vendor interface manager has access to one or more networks during its processing. The networks can be wired, wireless, or a combination of wired and wireless.

In an embodiment, vendor interface manager is the vendor/supplier interface 180 of the FIG. 1.

The vendor interface manager includes processing directed to automated actions and semi-automated actions acquired through a vendor-facing interface.

In an embodiment, the vendor interface manager's vendor-facing interface is a browser-based interface accessible via a network connection and resides on a server that processes the vendor interface manager. In an embodiment, some or all portions of the vendor-facing interface can process on a POS device as an application that interacts with other aspects of the vendor interface manager on a server. In an embodiment, the vendor interface manager includes some processing available to vendors through automated applications as API calls.

At 310, vendor interface manager obtains a first set of actions to perform on a first channel. Again, the first channel can be any of the channels 110 depicted in the FIG. 1. In an embodiment, the first set of actions includes a set of 1 action. In an embodiment, the first set of actions includes a plurality of actions.

In an embodiment, at 311, the vendor interface manager automatically interfaces at least some of the first set of actions to at least one external system associated with a vendor. This was discussed above with respect to the FIG. 1. This can be achieved via automated API calls between systems 125-175 and corresponding external subsystems related thereto. Input parameters and output data provided and returned in the API calls can be defined via schema definitions.

According to an embodiment, at 312, the vendor interface manager interacts with a vendor using a Graphical User Interface (GUI) to define the first actions, such as a browser-based vendor-facing interface. This provides automated common access to the vendor from a variety of platforms and devices having access to the Internet.

At 320, the vendor interface manager links the first set of actions to at least one second channel. That is, the actions are made available for operation on one or more second and disparate channels from that which was associated with the first channel. This may entail normalizing the first set of actions into a generic processing format and then translating from the generic processing format to format expected by each of the one or more second and disparate channels.

In an embodiment, at 321, the vendor interface manager provides the linking when the vendor lacks automated access to the one or more second channels. This is a situation where the vendor lacks the ability to reach a consumer on the second channels and uses the vendor interface manager to achieve channel integration with each channel that the consumer is detected as using.

At 330, the vendor interface manager processes the first set of actions for transactions occurring on the first channel and each of the second channels. So, for example, advertisement formats and types of advertisements that a vendor supplies a consumer over the web 110B are consistent when that consumer uses digital signage 110G, a television 110H, a gaming device 110C, etc. for transactions.

According to an embodiment, at 340, the vendor interface manager delivers vendor-defined analytics to a vendor for the transactions. For example, the vendor accesses a vendor-facing interface associated with the vendor interface manager and provides instructions for generating notifications and reports based on vendor-defined analysis operations for the transactions. It is noted that generic notifications and reports can also be selected by the vendor via the vendor-facing interface as published through the analytics system 150.

In an embodiment, at 350, the vendor interface manager services vendor-defined inventory management for the transactions. So, for example, the vendor uses the vendor-facing interface to define its inventory data schema, API operations, and policy conditions. This vendor-supplied detail can be processed in an automated manner by the inventory-management system 170 to service inventory for the vendor. Again, the inventory management can be generically available and, perhaps, customized to the needs of the vendor (via vendor-supplied selections through the vendor-facing interface). That is, the actual inventory management can remain vendor controlled and accessed through the vendor-facing interface, can be partially controlled through the vendor-facing interface, or entirely controlled through the vendor-facing interface.

According to an embodiment, at 360, the vendor interface manager manages a vendor-defined loyalty system for the transactions. This scenario was discussed herein and above.

Figure 4:
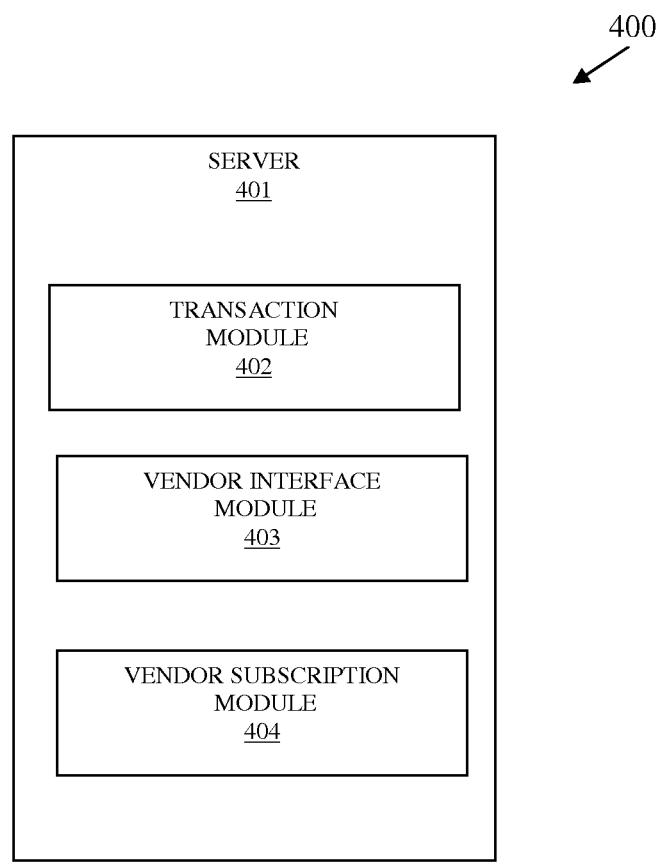
FIG. 4 is a diagram of a unified channel management system, according to an example embodiment.

FIG. 4 is a diagram of a unified channel management system 400, according to an example embodiment. Various components of the unified channel management system 400 are programmed and reside within memory and/or a non-transitory computer-readable medium and execute on one or more processors of one or more devices. The unified channel management system 400 has access and can communicate over one or more networks; and the networks can be wired, wireless, or a combination of wired and wireless.

The unified channel management system 400 includes a server 401 having a transaction module 402 and an vendor interface module 403 programmed within memory and/or a non-transitory computer-readable storage media as executable instructions for executing on one or more processors of the server 401. In an embodiment, the unified channel management system 400 also includes a vendor subscription module 403 programmed within memory and/or a non-transitory computer-readable storage media as executable instructions for executing on one or more processors of the server 401. Each of these components of the system 400 is now discussed in turn.

The server 401 includes one or more processors, memory, storage, and access to multiple networks (wired, wireless, or a combination of wired and wireless).

In an environment, the server 401 is multiple devices logically assembled as cloud processing environment (cloud).

The transaction module 402 is operable to execute as executable instructions, residing in a non-transitory computer-readable storage medium, on the server 401. Further, the transaction module 402 is operable (configured) to process or facilitate in the processing of multi-channel transactions occurring on POS devices. This was discussed above with reference to the FIGS. 1-3. Additionally, the transaction module 402 is operable to deliver consistent vendor-supplied advertisements during the multi-channel transactions to consumers of vendors. Again, this was discussed above with reference to the FIGS. 1-3.

In an embodiment, the transaction module 402 is the unified interface 120 described above with reference to the FIG. 1.

In an embodiment, the transaction module 402 is the transaction channel manager described above with reference to the FIG. 2.

According to an embodiment, the transaction module 402 is further operable (configured) to federate profiles for consumers across multiple channels. The federated profiles evaluated to at least partially determine the vendor-supplied advertisements (discussed above with reference to the FIGS. 1-2).

The vendor interface module 403 is operable to, at least partially, execute as executable instructions, residing in a non-transitory computer-readable storage medium, on the server 401. In an embodiment, at least some of the executable instructions for the vendor interface module 403 execute on a POS device.

The vendor interface module 403 is further operable to receive vendor-defined actions where at least one of those actions is relevant to determining the vendor-supplied advertisements during the multi-channel transactions (discussed above in the FIGS. 1 and 3).

In an embodiment, the vendor interface module 403 is the vendor/supplier interface 180 of the FIG. 1.

In an embodiment, the vendor interface module 403 is the vendor interface manager described above with reference to the FIG. 3.

According to an embodiment, the vendor interface module 403 is further operable to interface at least some of the vendor-defined actions to external systems associated with the vendor (discussed above in the FIGS. 1-3).

In an embodiment, the system 400 also includes a vendor subscription module 403 that is operable to execute as executable instructions, residing in a non-transitory computer-readable storage medium, on the server 401. The vendor subscription module 403 is also operable to manage subscriptions of vendors having access to the vendor interface module 402. The subscriptions can be of varying configured levels of access and security depending on conditions and pricing defined in the subscriptions.

It should be appreciated that where software is described in a particular form (such as a component or module) this is merely to aid understanding and is not intended to limit how software that implements those functions may be architected or structured. For example, modules 120 and 130 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   identifying, by a unified interface executing on a processor of a device, a transaction over a communication channel of a network;
   federating, by the unified interface, a profile for a consumer associated with a transaction over multiple communication channels, wherein federating further includes aggregating existing profiles for the consumer into the profile, wherein the existing profiles include:
   i) transaction histories of the consumer, ii) contact history for the consumer, iii) complaints noted by the consumer, iv) electronic search histories for the consumer, v) websites or services accessed by the consumer, and vi) consumer-noted preferences for the websites or the services from multiple disparate channels, and wherein federating further includes aggregating at least one additional profile that is specific to a vendor or a supplier associated with the consumer, and wherein federating further includes aggregating at least one of the existing profiles as a specific profile linked to a specific channel for the consumer and another specific profile linked to a set of channels for the consumer; and
   delivering, by the unified interface, an advertisement during the transaction based on:
   1) information included the federated profile for the consumer linked to the communication channel, 2) the multiple communication channels, and 3) the transaction, wherein delivering further includes determining the advertisement based on evaluation of conditions associated with: a time of day, a calendar day, a day of week, the federated profile, an identity of the consumer, an identifier for the communication channel, a physical location of a Point-Of-Service (POS) device being accessed by the consumer for the transaction, and other conditions defined in at least one vendor agreement associated with the advertisement, wherein the communication channel and the multiple communication channels comprise an email channel, a web-based channel, a gaming device channel, a POS channel, a mobile device channel, a call center channel, a digital sign channel, and a television channel;
   processing, by the unified interface during the transaction the identifying, the federating, and the delivering through proxy redirection from existing interfaces of other devices associated with the communication channel, the specific channel, the multiple communication channels, and the disparate channels to the unified interface, and providing the profile aggregated from the existing profiles in a normalized format to the existing interfaces during the transaction for obtaining the advertisement provided with the delivering, wherein the proxy redirection occurs based on the existing interfaces being associated with an existing authorization, and wherein the method is a transparent proxy for the existing interfaces; and
   processing the method for all of the multiple channels to provide the unified interface during subsequent transactions of the consumer on each of the multiple communication channels through each of the existing interfaces.

2. The method of claim 1 further comprising, facilitating, by the unified interface, the processing of the transaction over the communication channel based on profile information from the federated profile for the multiple communication channels.

3. The method of claim 1 further comprising, capturing, by the unified interface, metrics for the transaction and the consumer during the transaction for associating with the federated profile, the communication channel and the multiple communication channels.

4. The method of claim 1, wherein identifying further includes receiving transaction details including consumer identifying information from a Point-Of-Service (POS) device being accessed for the transaction to identify the transaction and federating the profile based on the consumer identifying information.

5. The method of claim 1, wherein federating further includes normalizing sub profiles associated with the consumer for the multiple communication channels into an aggregated profile representing the federated profile, each sub profile associated with a specific communication channel.

6. The method of claim 1, wherein federating further includes aggregating multiple profiles associated with the consumer as the federated profile, wherein each profile is associated with a different vendor loyalty account of the consumer, and wherein each multiple profile identifying channel-specific profile information when available.

7. The method of claim 1, wherein delivering further includes obtaining the advertisement from a marketing system that is at least partially defined by a vendor associated with the advertisement based on profile information in the federated profile and the multiple communication channels.

* * * * *